INVENTOR
KURT BÜTTEL

Aug. 2, 1966   K. BÜTTEL   3,263,273
ARRANGEMENT OF HINGED MOLDS FOR WAX-LIKE SOLIDS
Filed April 5, 1962   2 Sheets-Sheet 2

INVENTOR.
KURT BUTTEL
BY Malcolm W. Fraser
ATTORNEY

United States Patent Office 3,263,273
Patented August 2, 1966

3,263,273
ARRANGEMENT OF HINGED MOLDS FOR WAX-LIKE SOLIDS
Kurt Büttel, Rheinturkheim, Germany, assignor to Blendax-Werke R. Schneider & Co., Mainz (Rhine), Germany, a corporation of Germany
Filed Apr. 5, 1962, Ser. No. 185,364
Claims priority, application Germany, Apr. 7, 1961, B 62,043
5 Claims. (Cl. 18—26)

The invention concerns an arrangement of hinged molds for wax-like solids, which are arranged on longitudinal or circular continuous casting tables.

The casting of objects from wax-like solids (e.g. lipsticks) is achieved at continuous longitudinal or circular casting tables, in which the molds are hinged in the middle and rigidly fixed to a transport apparatus associated with the tables. They are filled in the first step of the process with melted material and cooled, and finally the mold is hinged open, the molding removed by hand and placed in its final holder (e.g. a lipstick holder). The removal by hand of individual moldings, cast in the molds in pairs or groups, is troublesome and requires a relatively large number of personnel, since the moldings are plastic and can be easily distorted. The invention has for its object basically to remove the disadvantages attached to the previously known production processes and to provide an apparatus in which the removal of the moldings can also be achieved automatically.

For overcoming these problems we propose a ring-shaped member, movable horizontally and vertically, set up on the mold receiving the wax-like solids, which extend the length of the actual mold by an amount which corresponds to that of the little cups which are to receive the finished moldings. Thereby it is possible to move away the mounting member of the invention (for example by lifting) before hinging the mold, and during the movement of the mold on the casting table to mount the little cups for the molding. The mold can then be hinged and the molding, held by the little cup, can then be moved automatically to the next process.

In a preferred embodiment of the invention, a bolt is provided on the housing arrangement of the molds for the mounting member and the circular mold opening of the mounting member is provided with a non-stick material on its inner surface. The centering of the mounting member with the mold is achieved preferably by means of a centering peg either on the mounting member or on the mold, which locates in a corresponding bore in the mold or the mounting member.

A new process working with an apparatus according to the invention is in essence characterised in that the mounting member forming a part of the mold is movable horizontally and vertically on a rigid shaft, and, after casting of the molding and its solidification, is lifted away from the mold by a cam and corresponding contact surface arranged on the mold table and swung out of the line of the molds. Then the base of the molding is freed and the cap can be fitted on, thus enabling the mold to be hinged open and the molding removed. For this process, movement runners and cams are arranged on the molding table and on the mounting member, which make possible the automatic movement of the mounting members. For this it is possible to provide several cam surfaces on the mold table so that the forms following one another in quicker rows can be guided at different heights or along different horizontal paths, so that setting the caps and removal of the complete objects is made easier and can be hastened.

Further advantages and characteristics of the apparatus according to the invention will appear from the following description when considered in the light of the attached drawings, in which.

Figure 1:
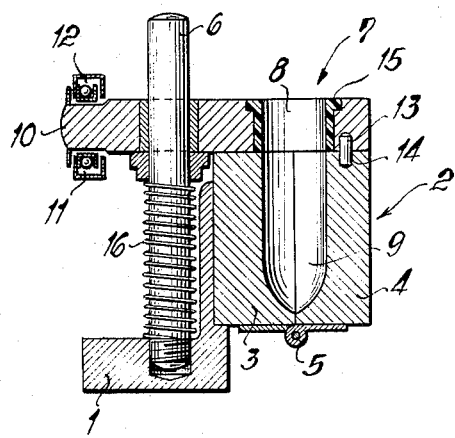
FIGURE 1 is a sectional view of a casting mold made in accordance with the invention.

With reference to FIGURE 1, the frame arrangement is identified by reference numeral 1, and the casting mold 2, comprising two hingeable parts 3 and 4 joined by a link 5, is attached thereto. In the arrangement shown, part 3 is fixed to the frame 1. Also attached to frame 1 is a bolt 6 which receives a mounting member 7. The mounting member 7 comprising a plate provided with an opening 8 which is arranged to be centered over the aperture 9 of the mold 2. The mounting member 7 also has, on the side furthest from the mold 2, a projecting part 10 which is provided with cams or rollers 11 and 12 working with correspondingly shaped cam surfaces or runners on the mold table (not shown). A centering peg 13, is arranged on the mounting member 7 and grips in a corresponding bore 14 in the mold, thus ensuring an exact placing of the opening 8 over the aperture 9.

The inner surface of the opening 8 is provided with a non-stick material 15, which may be e.g. polytetrafluoroethylene or a modified plastic. The mounting member 7 itself is made out of the same material as the mold 2 in order to reduce differences in the thermal expansion of the two members. For the material for making the mold 2 and the mounting member 7, brass or German silver or a plastic of similar characteristics is recommended. In order to assist the vertical movement of the mounting member 7 which can slide on the bolt 6, there is provided a spring 16 between the member 7 and the lower part of the frame 1 which eases the upward movement as the cams 11 and 12 run on the corresponding surface on the mold table.

By means of the cams or rollers 11 and 12, the track attached to the mold table and the continual movement of the mold carrier, the mounting member 7 is raised or lowered. In its raised position, cams provided on the mold table cause the member 7 to be swung so that the placing of the cap on the end of the molding is definitely possible.

Figure 2:
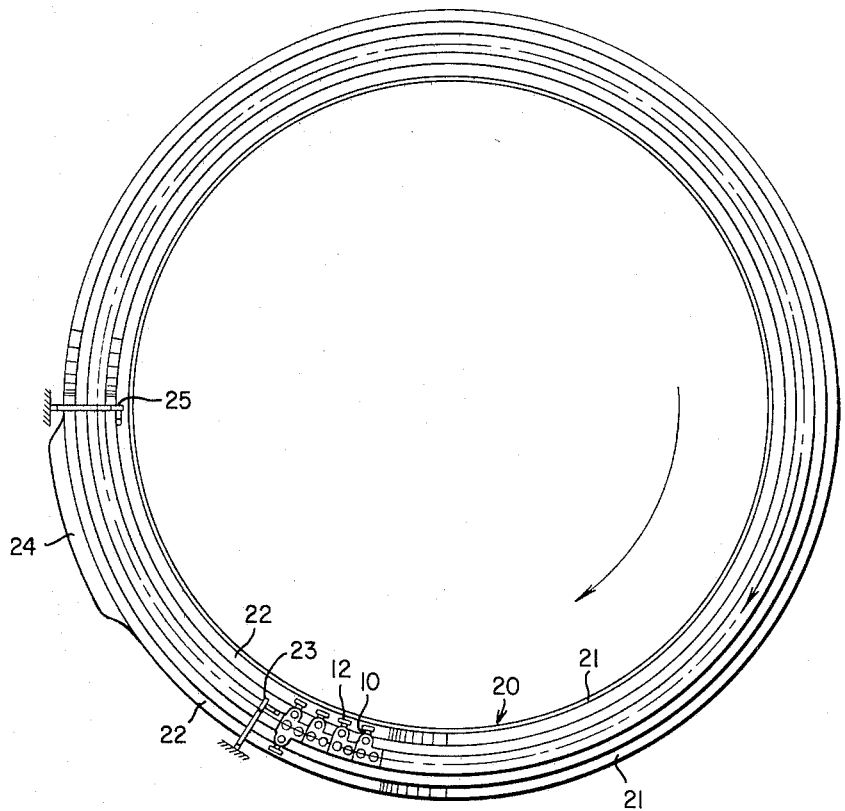
FIGURE 2 is a plan view of a mold table and camming device for operating the mold apparatus of the invention illustrated in FIGURE 1.
Figure 3:
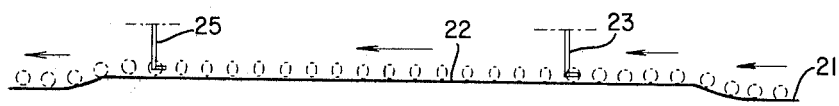
FIGURE 3 is a diagrammatic elevational view of a mold table and camming device illustrated in FIGURE 2.

FIGURES 2 and 3 illustrate a mold table generally indicated by reference numeral 20 having a pair of annular coaxially arranged guide rails 21, which each have an elevated portion 22. The guide rails 21 are provided to support the cams or rollers 11 and 12 of the casting apparatus illustrated more specifically in FIGURE 1. It will be appreciated that as the casting apparatus is caused to be moved about a circular path on the guide rails 21, the cams or rollers 11 and 12 are caused to be elevated and ride on the elevated section of the guide roll 22. In the elevated position, the projecting part 10 and its associated mounting member 7 are raised from the casting mold 2, since the casting mold is held in its relatively lower position by the frame member 1. As the apparatus continues to move about its circular path, the apparatus contacts a downwardly depending abutment 23 which is effective to turn the mounting member 7 about the axis of the bolt 6 thereby effectively allowing the casting mold 2 to open and enabling the finished parts to be discharged at a discharge station indicated at reference numeral 24.

As the apparatus continues to move further about its circular path, it contacts a downwardly depending abutment 25 which effectively turns the mounting member 7 returning the same to a position over the casting mold. Then the apparatus continues onto the original level of the guide rail 21 allowing the mounting member 7 once again to assume a position immediately above and contact with the upper surface of the casting mold 2. In this condition, the molding apparatus is once again ready to be filled with the wax-like material to be molded.

Naturally, the invention is not limited to the single embodiment described and shown in the drawing; there are on the contrary many modifications possible without departing from the basic principles.

I claim:
1. An apparatus for continuously molding wax-like materials including:
   at least one mold consisting of a pair of vertically extending mold sections having mating cavities therein;
   bottom hinge means for pivotally connecting said mold sections such that when said sections are juxtaposed the mating cavities form a single cavity opening opposite said hinge means;
   vertically extending support means integral with one of said mold sections;
   an upstanding bolt mounted on said support means and adjacent said integral mold section;
   a cover member slidably mounted on said upstanding bolt, said cover member extending over said mold sections and having an aperture alignable with the opening of the cavity of said mold sections, said cover member including camming means for moving said cover member relative to said mold sections; and
   a centering peg forming a connection between said cover member and the second of said mold sections for aligning said cavity opening with said aperture.
2. Apparatus as defined in claim 1 including a non-stick material surrounding the aperture of said cover member.
3. Apparatus as defined in claim 1 wherein said cover member is formed of a non-stick material.
4. Apparatus as defined in claim 1 including a spring on said bolt to assist the movement of said cover member relative to said mold.
5. Apparatus as defined in claim 1 including cam surfaces on an associated working mold table to cooperate with the camming means of said cover.

References Cited by the Examiner
UNITED STATES PATENTS

| | | | |
|---|---|---|---|
| 624,191 | 5/1899 | Dennis | 249—119 |
| 1,176,346 | 3/1916 | Cooper | 249—170 X |
| 1,638,696 | 8/1927 | Lewis. | |
| 1,711,978 | 5/1929 | Wanders | 18—20 |
| 2,192,675 | 3/1940 | Ferentzy. | |
| 2,298,913 | 10/1942 | Arden et al. | |
| 2,403,476 | 7/1946 | Berry et al. | |
| 2,414,466 | 1/1947 | Hummel | 18—26 |
| 2,476,710 | 1/1949 | Eaton | 18—26 |
| 2,677,151 | 5/1954 | Jennings | 264—330 |
| 2,709,278 | 5/1955 | Greer | 264—330 |
| 2,736,277 | 2/1956 | Cole | 249—170 |
| 2,799,045 | 7/1957 | Hillegas. | |
| 2,875,471 | 3/1959 | Crowther | 18—20 |
| 2,879,548 | 3/1959 | Croce et al. | 18—58 |

WILLIAM J. STEPHENSON, *Primary Examiner.*

ALEXANDER H. BRODMERKEL, FRANK E. BAILEY, *Examiners.*